United States Patent
Neudorf et al.

(10) Patent No.: US 8,578,692 B2
(45) Date of Patent: Nov. 12, 2013

(54) ROTARY MOWER WITH OPTIONAL LOWER SKIN

(75) Inventors: Blake Neudorf, Vonda (CA); Zachary Berglund, Vonda (CA)

(73) Assignee: Highline Manufacturing Ltd, Vonda, Saskatchewan (CA)

( * ) Notice: Subject to any disclaimer, the term of this patent is extended or adjusted under 35 U.S.C. 154(b) by 71 days.

(21) Appl. No.: 13/072,044

(22) Filed: Mar. 25, 2011

(65) Prior Publication Data

US 2011/0277439 A1 Nov. 17, 2011

(51) Int. Cl.
*A01D 67/00* (2006.01)

(52) U.S. Cl.
USPC .......................................................... 56/320.1

(58) Field of Classification Search
USPC ............. 56/320.1, 17.4, 17.5, 503, 255, 295, 56/DIG. 24, DIG. 20
See application file for complete search history.

(56) References Cited

U.S. PATENT DOCUMENTS

| | | | | |
|---|---|---|---|---|
| 2,529,870 A * | 11/1950 | Golasky | ......................... | 56/17.2 |
| 2,706,372 A * | 4/1955 | Blydenburgh | ................ | 56/12.9 |
| 3,134,212 A * | 5/1964 | Gary | ......................... | 56/16.4 R |
| 3,387,446 A * | 6/1968 | Kasper | ............................ | 56/503 |
| 4,189,903 A * | 2/1980 | Jackson et al. | .................. | 56/255 |
| 4,407,112 A * | 10/1983 | Shepherd et al. | ............... | 56/13.4 |
| 4,944,142 A * | 7/1990 | Sueshige et al. | ............. | 56/320.1 |
| 5,133,176 A * | 7/1992 | Baumann et al. | ............. | 56/17.4 |
| 5,212,938 A * | 5/1993 | Zenner et al. | ................. | 56/320.1 |
| 5,457,947 A * | 10/1995 | Samejima et al. | ............. | 56/16.7 |
| 5,465,564 A * | 11/1995 | Koehn et al. | ................. | 56/320.2 |
| 6,052,980 A * | 4/2000 | Friesen | ........................ | 56/320.1 |

* cited by examiner

*Primary Examiner* — Alicia Torres
(74) *Attorney, Agent, or Firm* — Dicke, Billig & Czaja, PLLC

(57) ABSTRACT

A rotary mower apparatus includes a mower deck with a frame, an upper skin attached to the frame, and a lower skin removably attached to the frame below the upper skin such that a separation distance is provided between the upper and lower skins. A blade assembly is removably mounted to the deck below the lower skin and a drive is mounted to the deck and is operative to rotate the blade assembly. The lower skin can also be provided with retarding members on the underside thereof to retard the flow of cut vegetation, and to thereby cut the vegetation into smaller pieces.

15 Claims, 5 Drawing Sheets

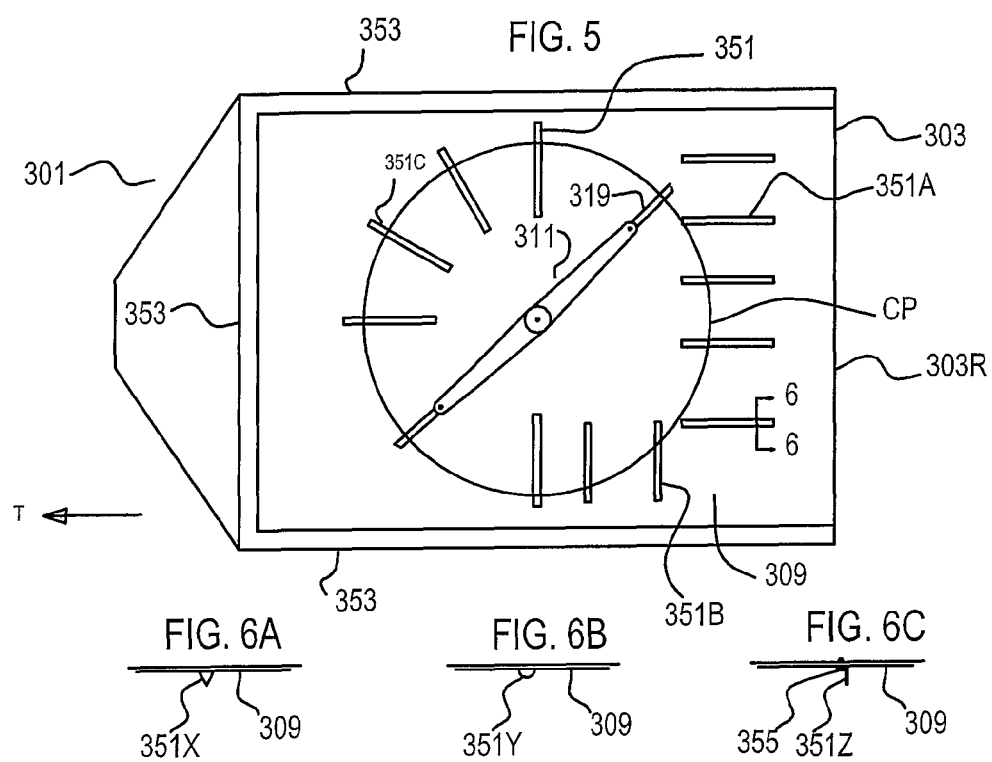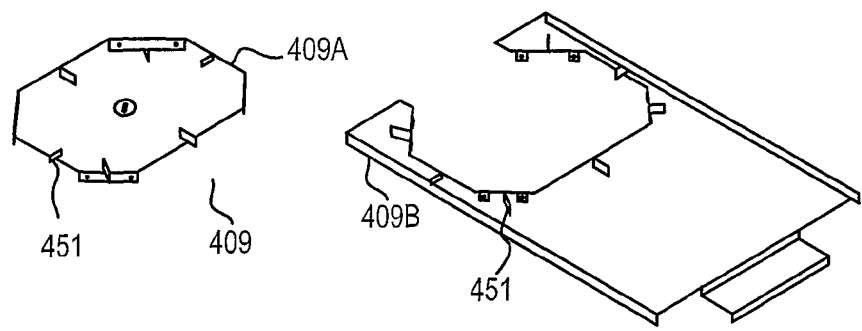

ROTARY MOWER WITH OPTIONAL LOWER SKIN

FIELD OF THE INVENTION

This invention is in the field of rotary mowers and in particular a rotary mower with the option to have a second skin under the deck to protect the top skin from damage, or to retard material flow to make a finer cut.

BACKGROUND

Rotary mowers comprise generally a mower deck, a rotating blade assembly under the deck, and a driveline connecting the blade assembly to a rotating power source, typically the power take off of a tractor to which the mower is mounted or connected by a hitch for towing.

The mower deck comprises a frame that provides the skeleton of the deck. Brackets, hitches, and the like for mounting or towing the mower are attached to a front member the frame, and wheels may be mounted to the frame at various locations to support the deck for travel along the ground. The driveline typically includes a gear box or a hydraulic motor mounted on top of a central frame member, and a shaft extending downward through the center of the deck. The blade assembly is then mounted to the shaft under the deck.

A skin of relatively thin metal covers the frame and provides the finished top side of the deck, and generally extends downward along the sides of the deck. The skin encloses the blade assembly and maintains the material being cut under the deck where same may be contacted multiple times and thus be cut into small pieces, which is generally desired. The skin also prevents material, including rocks and like hazardous objects, from being thrown upward or laterally by the rotating blades.

The rapidly rotating blades commonly strike rocks and like objects at high speed, throwing the objects and also sometimes bending the blades. It is also therefore common to provide a blade ring that extends downward from the top of the deck above the circular path of the blades. The ring prevents bent blades from striking the skin on the top of the deck and damaging the skin. Many of these thrown objects however are thrown upward and strike the skin of the deck such that after a relatively short period of usage, depending on the conditions of use and terrain being cut, the skin of a mower deck is often badly dented or even punctured, and is unsightly. The paint on the skin is damaged such that rust and corrosion rapidly occur, and debris more readily gathers on the top of the skin and is difficult to clean off.

For this reason some manufacturers provide a second lower skin welded to the frame some distance under the upper skin. Thus objects thrown by the blades strike the bottom skin, causing dents or punctures, while the top skin remains relatively unscathed. This second skin however adds significantly to the cost of the mower, putting the manufacturer at a price disadvantage over other mowers. The manufacturer could offer the lower skin as an option, however that can significantly increase inventory costs as the manufacturer and distribution network must carry both mowers. Since rotary mowers are typically available in a variety of sizes, the cost can be prohibitive.

SUMMARY OF THE INVENTION

It is an object of the present invention to provide a rotary mower apparatus that overcomes problems in the prior art.

In a first embodiment the present invention provides a rotary mower apparatus comprising a mower deck comprising a frame, an upper skin attached to the frame, and a lower skin removably attached to the frame below the upper skin such that a separation distance is provided between the upper and lower skins. A blade assembly is removably mounted to the deck below the lower skin and a drive is mounted to the deck and is operative to rotate the blade assembly.

In a second embodiment the present invention provides a method of providing an optional lower skin for a rotary mower. The method comprises manufacturing a rotary mower apparatus with a mower deck comprising a frame and an upper skin attached to the frame, a blade assembly removably mounted to the mower deck below the upper skin, and a drive mounted to the mower deck and operative to rotate the blade assembly; providing an optional lower skin removably attachable to the frame below the upper skin and above the blade assembly such that a separation distance is provided between the upper and lower skins; when the optional lower skin is required, attaching the lower skin.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 5 is a schematic bottom of a lower skin mounted on a mower deck with no blade ring where the lower skin includes a plurality of retarding members;

FIGS. 6A-6C schematically illustrate a variety of cross-sectional shapes of retarding members for use with the lower skin of FIG. 5;

FIG. 7 is a schematic perspective view of a two piece lower skin for mounting on a mower deck with a blade ring where the inner and outer lower skin sections include a plurality of retarding members.

DETAILED DESCRIPTION OF THE ILLUSTRATED EMBODIMENTS

Figure 1:
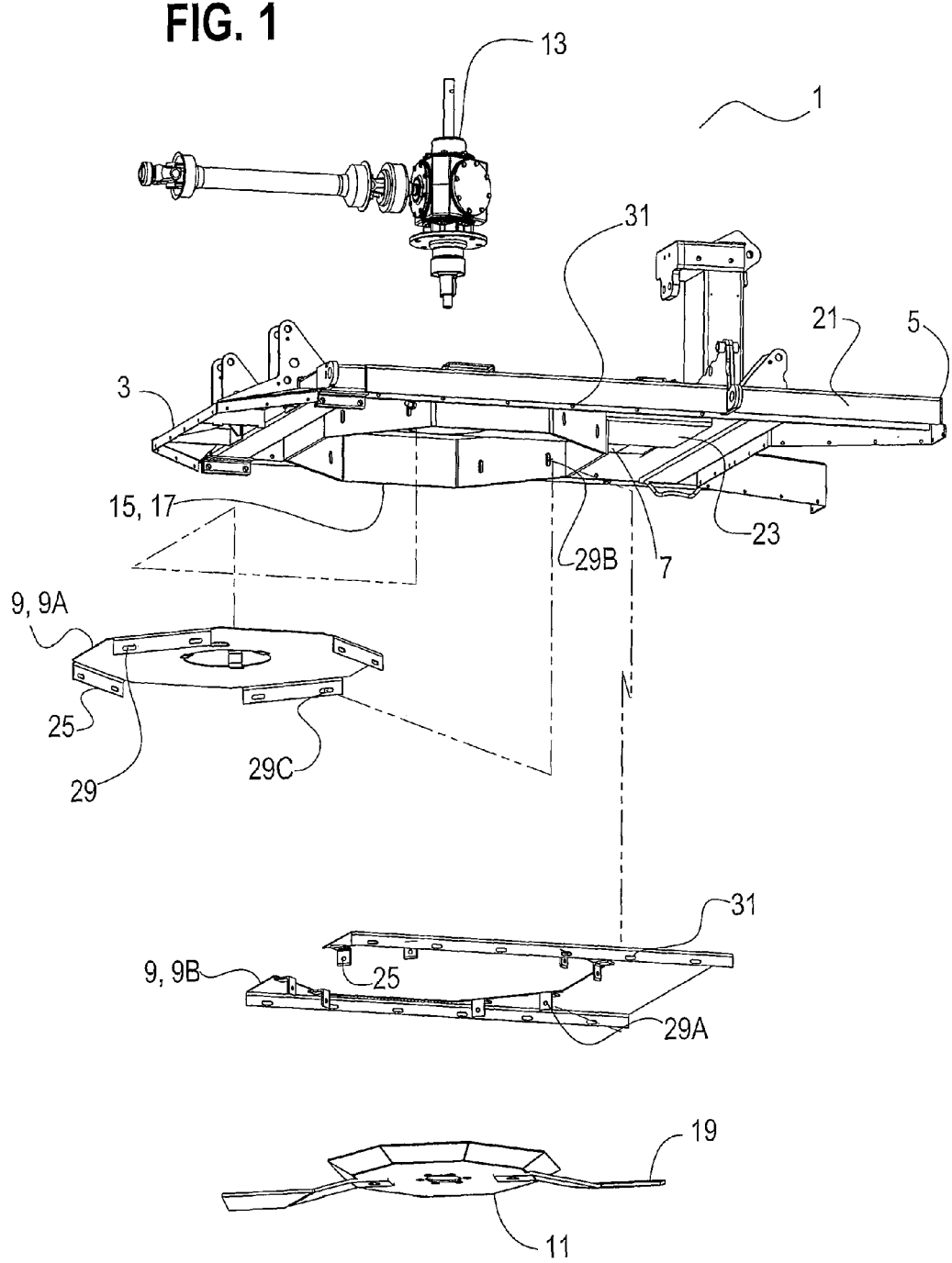
FIG. 1 is an exploded perspective view of an embodiment of a rotary mower apparatus of the present invention.

FIG. 1 illustrates a perspective exploded view of an embodiment of a rotary mower apparatus 1 of the present invention. The apparatus 1 includes a mower deck 3 comprising a frame 5, an upper skin 7 attached to the frame 5 and a lower skin 9 removably attached to the frame 5 below the upper skin 7 such that a separation distance is provided between the upper and lower skins 7, 9. A blade assembly 11 is removably mounted to the deck 3 below the lower skin 9 and a drive 13 is mounted to the deck 3 and is operative to rotate the blade assembly 11 when connected to a power source such as the power take off of a towing or mounted tractor.

The illustrated apparatus 1 includes a blade ring 15 attached to the frame 5 and extending downward from the frame 5 such that a lower edge 17 of the blade ring 15 is above a circular path of blades 19 of the blade assembly 11.

The lower skin 9 comprises an inner lower skin section 9A removably attached to the frame 5 inside the blade ring 15 and an outer lower skin section 9B removably attached to the frame 5 outside the blade ring 15. The illustrated frame 5 is made up of front, rear, and side frame members 21 and a center frame member 23 that extends from the front of the frame 5 to the rear thereof. The upper skin 7 is welded on the top side of frame members 21, 23 and the lower skin 9 is attached on a bottom side the frame members 21, 23 such that a separation distance is provided between the upper and lower skins 7, 9.

Figure 2:
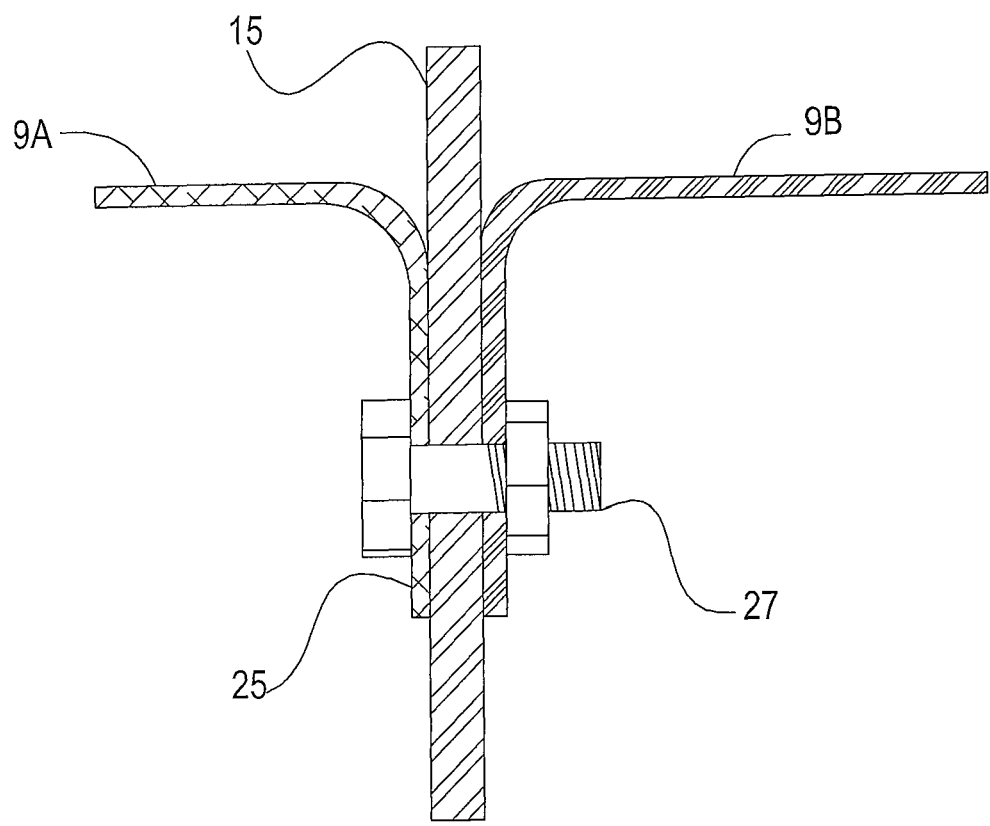
FIG. 2 is a schematic sectional side view of a removable fastener extending through the flanges and blade ring.

In the illustrated apparatus the inner and outer lower skin sections 9A, 9B are removably attached to the frame 5 by removable fasteners 27, such as bolts, screws, or the like, attaching the inner and outer lower skin sections 9A, 9B to the blade ring 15. The inner and outer lower skin sections 9A, 9B include flanges 25 that extend downward adjacent to the blade ring 15, and removable fasteners 27 extend through holes 29 in the flanges 25 and blade ring 15. Conveniently the holes can be configured so that a fastener 27 extends through a hole 29A in a flange on the outer lower skin section 9B, then through a hole 29B in the blade ring, and then through a hole 29C in a flange on the inner lower skin section 9A. Thus one fastener is used to mount both the inner and outer skin sections 9A, 9B to the blade ring 15, as schematically illustrated in FIG. 2.

The inner skin section 9A has flanges 25 and fasteners around the periphery thereof and so can be removably attached to the frame 5 only by attachment to the blade ring 15. The outer lower skin section 9B is removably attached to the frame 5 by further removable fasteners through holes 31 adjacent to a periphery of the outer lower skin section 9B and a periphery of the frame 5.

In the illustrated apparatus inner and outer lower skin sections 9A, 9B are attached so that the lower skin 9 is against the bottom surface of the central frame member 23, and the upper skin 7 is against the top surface of the central frame member 23. The separation distance between the upper and lower skins 7, 9 is thus about equal to the depth of the central frame member 23. This separation distance allows the lower skin 9 to be pushed up and dented or punctured by rocks and the like thrown upward by the blade assembly 11 without damaging the upper skin 7

In the apparatus 1 of FIG. 1, the blade assembly 11 is removed to attach and remove the lower skin 9.

Figure 3:
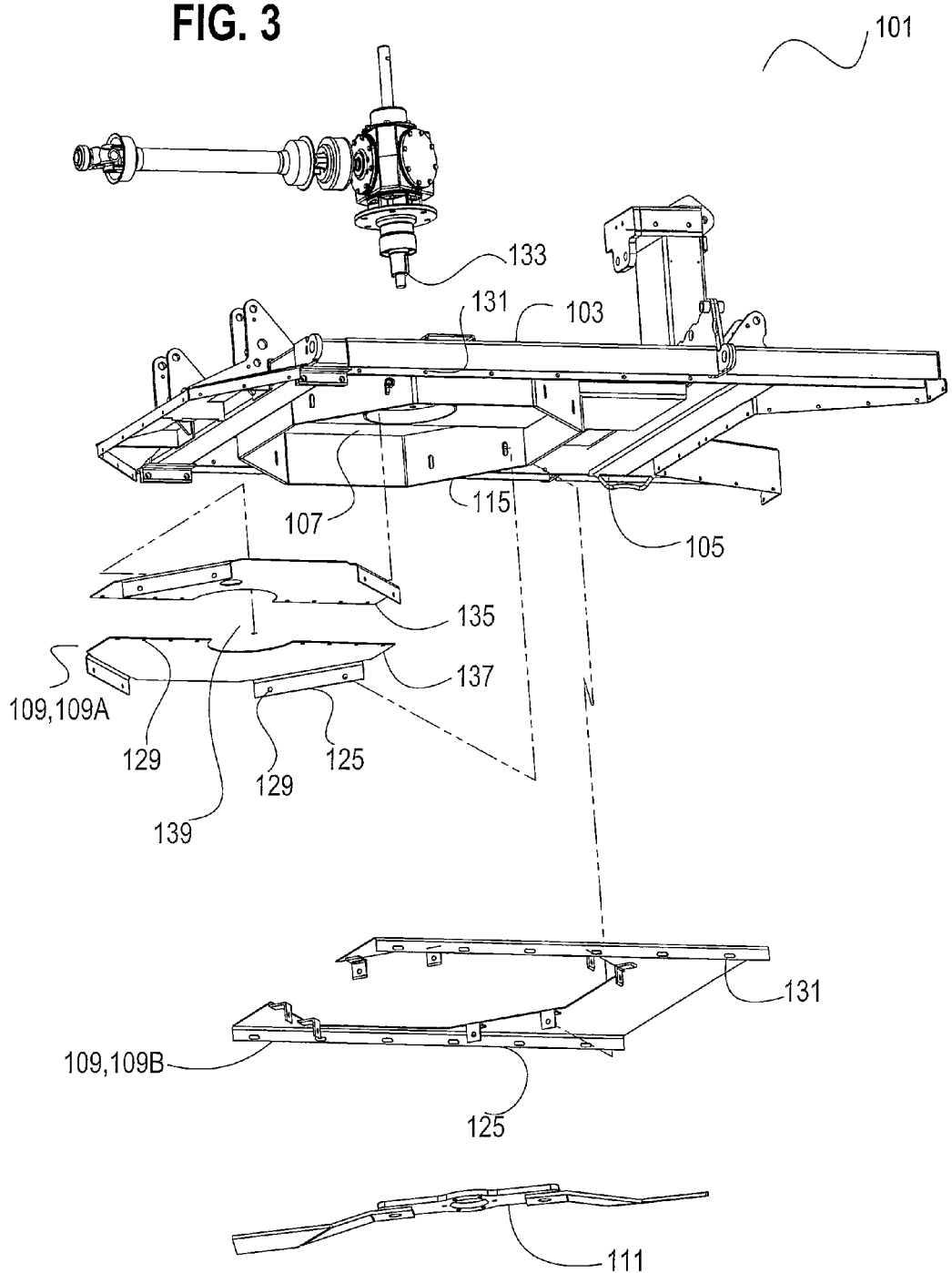
FIG. 3 is an exploded perspective view of an alternate embodiment of a rotary mower apparatus of the present invention where the inner lower skin section is provided in two separate pieces.

FIG. 3 illustrates an alternate rotary mower apparatus 101 where the blade assembly 111 does not need to be removed to attach and remove the lower skin 109. In the apparatus 101, the drive comprises a drive shaft 133 extending downward through the upper and lower skins 107, 109. The blade assembly 111 is removably mounted to the mower deck 103 below the lower skin 109 by attachment to the drive shaft 133. The inner skin section 109A comprises first and second skin portions 135, 137 that are attached to the frame 105 inside the blade ring 115 such that the drive shaft 133 extends through a hole 139 defined by the attached first and second skin portions 135, 137. The first and second skin portions 135, 137 of the inner skin section 109A are removably attached to the frame 105 by removable fasteners such as bolts, screws, or the like, attaching the first and second skin portions 135, 137 to the blade ring 115, and to each other through holes 129.

The first and second skin portions 135, 137 of the inner lower skin section 109A, and the outer lower skin section 109B include flanges 125 that extend downward adjacent to the blade ring 115, and removable fasteners extend through holes 129 in the flanges 125 and blade ring 115 as described above.

The inner skin section 109A has flanges 125 and fasteners around the periphery thereof and so can be removably attached to the frame 105 only by attachment to the blade ring 115. The outer lower skin section 109B is removably attached to the frame 105 by further removable fasteners through holes 131 adjacent to a periphery of the outer lower skin section 109B and a periphery of the frame 105.

In FIG. 3 the illustrated blade assembly 111 is an open blade assembly rather than the pan type blade assembly as illustrated in FIG. 1. Such an open blade assembly 111 provides easy access to the area above the blade assembly 111 to attach bolts and nuts to secure the first and second skin portions 135, 137 and also to secure the outer skin section 109B. It is contemplated however that sufficient access could also be available with a pan type blade assembly such as shown in FIG. 1.

Figure 4:
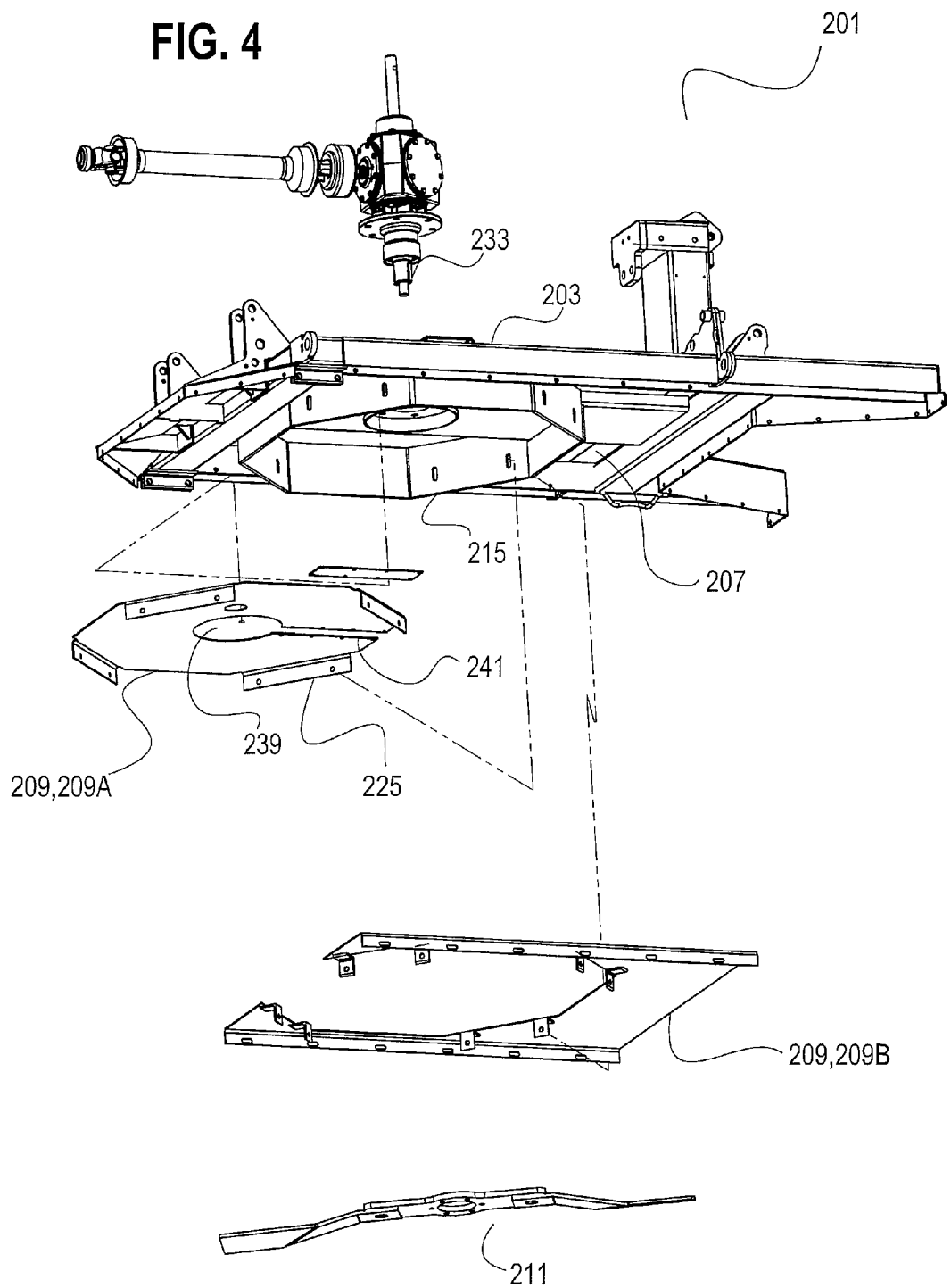
FIG. 4 is an exploded perspective view of a further alternate embodiment of a rotary mower apparatus of the present invention where the inner lower skin section is a single piece with a central aperture to accommodate the drive shaft, and a slot from the central aperture to the outside edge of the section.

FIG. 4 illustrates a further alternate rotary mower apparatus 201 where the blade assembly 211 does not need to be removed to attach and remove the lower skin 209. Again in the apparatus 201, the drive comprises a drive shaft 233 extending downward through the upper and lower skins 207, 209, and the blade assembly 211 is removably mounted to the mower deck 203 below the lower skin 209 by attachment to the drive shaft 233. In this apparatus 201 the inner skin section 209A is a single piece which defines a central shaft aperture 239, and a slot 241 extending from the central shaft aperture 239 to an outer edge of the inner skin section 209A. The slot 241 has a width greater than a diameter of the drive shaft 233 such that the drive shaft 233 can slide along the slot 241 and so that the inner skin section 209A can be positioned so that flanges 225 on the outer edges of the inner skin section 209A can be bolted to the blade ring 215.

FIG. 5 schematically illustrates a bottom view of a rotary mower apparatus 301 that does not have a blade ring as is illustrated in the apparatuses above. Vegetation is cut by the blades 319 of the blade assembly 311 and, since cut vegetation is generally confined by front and side panels 353, the cut vegetation is forced by the rotating blades 319 into a flow path substantially tangential to the circular path CP of the rotating blades 319 under the mower deck 303 and is thrown out the open rear end 303R of the mower deck 303.

The lower skin 309 of the apparatus 301 has a plurality of elongate retarding members 351 mounted on the underside of the lower skin 309. Each retarding member 351 extends transverse to the circular path CP of blades 319 of the blade assembly 311, and transverse to a flow path of cut vegetation. The retarding members 351 retard the flow of cut vegetation such that the vegetation is retained under the mower deck 303 for an increased period of time, and is thus contacted by the blades 319 an increased number of times, and so is cut into smaller pieces, increasing the fineness of the cut.

The retarding members 351 can be positioned in a variety of orientations, as illustrated in FIG. 5, and still achieve the retarding action needed to increase the fineness of cut. Basically the retarding members 351 are oriented transverse to, or generally across, the circular path CP of the blades 319 so that the flow of cut vegetation tangential to that path is retarded. Retarding members 351A are oriented in alignment with the operating travel direction T, while retarding members 351B are oriented substantially perpendicular to the operating travel direction T. Both retarding members 351A, 351B are positioned so that they are transverse to the circular path CP The lower skin 309 with retarding members 351 is suited for operation in relatively dry vegetation, such as dead plants and stalks, but is not well suited to cutting wet vegetation. Pieces of dry cut vegetation move readily against each other and slide along the steel bottom surfaces of the lower skin 309 such that, while the retarding members 351 retard the flow of pieces of cut vegetation, the flow is maintained. Pieces of wet or moist cut vegetation tend to stick to each other, and to the retarding members 351 and to the bottom of the lower skin 309, greatly increasing power requirements and reducing the effectiveness of the mowing operation.

Retarding members 351C are positioned such that they extend substantially radially with respect to the circular path CP, and are substantially equally spaced along the circular path CP. This configuration has the advantage that the degree of retardation of the vegetation flow is substantially equal around the circular path CP.

The retarding members 351 can take a variety of shapes as well and still perform the retarding function. FIG. 6A illustrates a retarding member 351X that has a triangular cross section. FIG. 6B illustrates a retarding member 351Y that has a semicircular cross section. FIG. 6C illustrates a retarding member 351Z that has a rectangular cross section.

While the retarding members 351 can be attached to the underside of the lower skin 309 by welding or the like, it may also be desirable to make the retarding members 351 removable. For example in FIG. 6C the retarding member 351Z is attached to the lower skin 309 by a removable bolt 355.

FIG. 7 illustrates a lower skin 409 similar to that illustrated in FIG. 1 where the underside of the mower deck has a blade ring extending downward and configured such that a bottom edge of the blade ring is located above and in proximity to the circular path of the blades. The lower skin 409 comprises an inner lower skin section 409A removably attached to the frame inside the blade ring and an outer lower skin section 409B removably attached to the frame outside the blade ring.

The inner and outer lower skin sections 409A, 409B are substantially as illustrated in FIG. 1 but with the addition of retarding members 451 attached to the underside of the inner and outer lower skin sections 409A, 409B and positioned so that they are transverse to the circular path of the blades. In the illustrated lower skin 409, retarding members 451 are mounted on both the inner and outer lower skin sections 409A, 409B, and are oriented substantially radially with respect to the circular path of the blades with lower edges of the retarding members 451 located somewhat above the vertical level of the lower edge of the blade ring, when installed.

It is contemplated as well that the retarding members 451 could be oriented otherwise and still transverse to the circular path of the blades, and that the lower edges of the retarding members 451 could be located at about the same vertical level as the lower edge of the blade ring, when installed. Also retarding members 451 might be attached only on one or the other of the inner and outer lower skin sections 409A, 409B.

Thus the present invention provides a method of providing an optional lower skin 9 for a rotary mower. The method comprises manufacturing a rotary mower apparatus 1 with a mower deck 3 comprising a frame 5 and an upper skin 7 attached to the frame 5, a blade assembly 11 removably mounted to the mower deck 3 below the upper skin 7, and a drive 13 mounted to the mower deck 3 and operative to rotate the blade assembly 11; providing a lower skin 9 removably attachable to the frame 5 below the upper skin 7 and above the blade assembly 11 such that a separation distance is provided between the upper and lower skins 7, 9; and when the optional lower skin is required, removing the blade assembly 11 attaching the lower skin 9, and reattaching the blade assembly 11.

Thus an end retailer or dealer can provide a wide variety of sizes of mowers with the optional lower skin for a reasonable cost by keeping a number of lower skins in stock, or ordering same from a nearby distributor. The persons who usually set up equipment of various kinds at dealerships can readily install the lower skin if needed. In addition to protecting the upper skin, the lower skin can also be provided with retarding members on the underside thereof to retard the flow of cut vegetation, and to thereby cut the vegetation into smaller pieces.

A further benefit is realized in that if the lower skin becomes excessively damaged, it could be removed and replaced with a new lower skin.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotary mower apparatus comprising:
  a mower deck comprising:
    a frame;
    an upper skin attached to the frame; and
    a lower skin removably attached to the frame below the upper skin such that the lower skin is stationary during operation and such that a separation distance is provided between an entirety of the upper and lower skins;
  a blade assembly removably mounted to the deck below the lower skin; and
  a drive mounted to the deck above the upper skin and operative to rotate the blade assembly.

2. The apparatus of claim 1 configured such that the blade assembly is removed to attach and remove the lower skin.

3. The apparatus of claim 1 wherein the upper skin is attached on a top side of at least one frame member of the frame and the lower skin is attached on a bottom side of the at least one frame member of the frame.

4. The apparatus of claim 1 comprising a plurality of elongate retarding members mounted on the underside of the lower skin, each retarding member extending transverse to a circular path of blades of the blade assembly, and transverse to a flow path of cut vegetation.

5. The apparatus of claim 1 further comprising a blade ring attached to the frame and extending downward from the frame such that a lower edge of the blade ring is above a circular path of blades of the blade assembly, and wherein the lower skin comprises an outer lower skin section removably attached to the blade ring outside the blade ring.

6. The apparatus of claim 5 wherein the outer lower skin section is removably attached to the frame by removable fasteners attaching the outer lower skin section to the blade ring.

7. The apparatus of claim 6 wherein the outer lower skin section includes flanges extending downward adjacent to the blade ring, and wherein the fasteners extend through holes in the flanges and blade ring.

8. The apparatus of claim 7 comprising an inner lower skin section with flanges extending downward adjacent to the blade ring and wherein at least one fastener extends through a hole in a flange on the outer lower skin section, then through a hole in the blade ring, and then through a hole in a flange on the inner lower skin section.

9. The apparatus of claim 5 wherein the outer lower skin section is removably attached to the frame by removable fasteners through holes adjacent to a periphery of the outer lower skin section and a periphery of the frame.

10. The apparatus of claim 1 wherein the lower skin is removably attached to the frame by removable fasteners comprising at least one of bolts and screws.

11. A method of providing an optional lower skin for a rotary mower, the method comprising:
 manufacturing a rotary mower apparatus with a mower deck comprising a frame and an upper skin attached to the frame, a blade assembly removably mounted to the mower deck below the upper skin, and a drive mounted to the mower deck above the upper skin and operative to rotate the blade assembly;
 providing a blade ring attached to the frame and extending downward from the frame such that a lower edge of the blade ring is above a circular path of blades of the blade assembly;
 providing an optional lower skin removably attachable to the blade ring below the upper skin and above the blade assembly such that a separation distance is provided between the upper and lower skins wherein the lower skin comprises an outer lower skin section removably attachable to the blade ring outside the blade ring; and
 when the optional lower skin is required, attaching the lower skin.

12. The method of claim 11 wherein the outer lower skin section is removably attachable to the blade ring by removable fasteners attaching the outer lower skin section to the blade ring.

13. The method of claim 12 wherein the outer lower skin section includes flanges extending downward adjacent to the blade ring, and wherein the fasteners extend through holes in the flanges and blade ring.

14. A rotary mower apparatus comprising:
 a mower deck comprising:
 a frame;
 an upper skin attached to the frame; and
 a lower skin removably attached to the frame below the upper skin such that a separation distance is provided between the upper and lower skins;
 a blade assembly removably mounted to the deck below the lower skin;
 a drive mounted to the deck above the upper skin and operative to rotate the blade assembly;
 a blade ring attached to the frame and extending downward from the frame such that a lower edge of the blade ring is above a circular path of blades of the blade assembly, and wherein the lower skin comprises flanges extending downward adjacent to the blade ring, and wherein removable fasteners extend through holes in the flanges and blade ring is attached to the blade ring by removable fasteners.

15. The apparatus of claim 14 wherein the lower skin comprises an inner lower skin section removably attached to the frame inside the blade ring and an outer lower skin section removably attached to the frame outside the blade ring.

* * * * *